Sept. 27, 1932.  J. C. BOHMKER  1,879,787
CORN PLANTER
Filed April 23, 1931  4 Sheets-Sheet 4

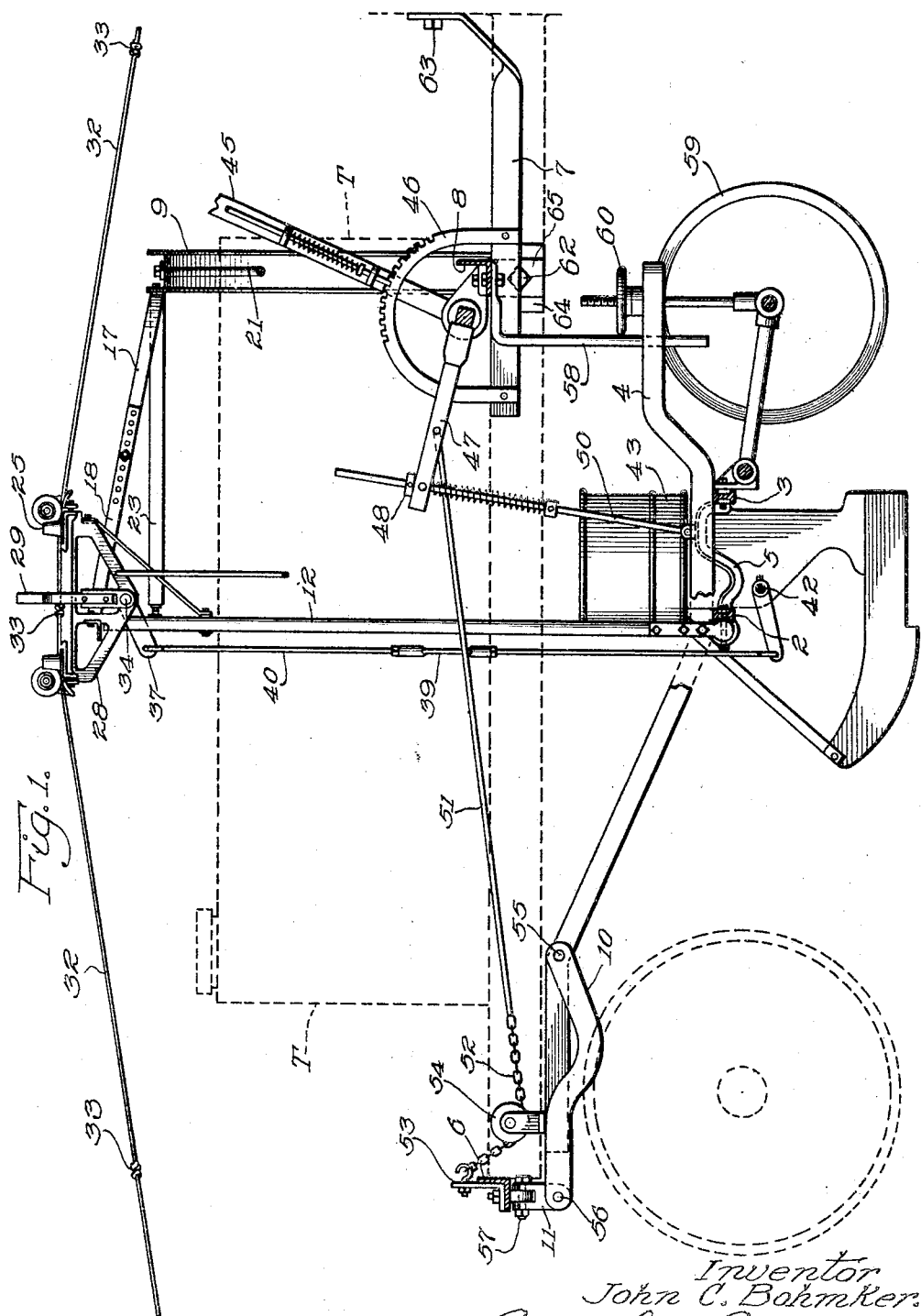

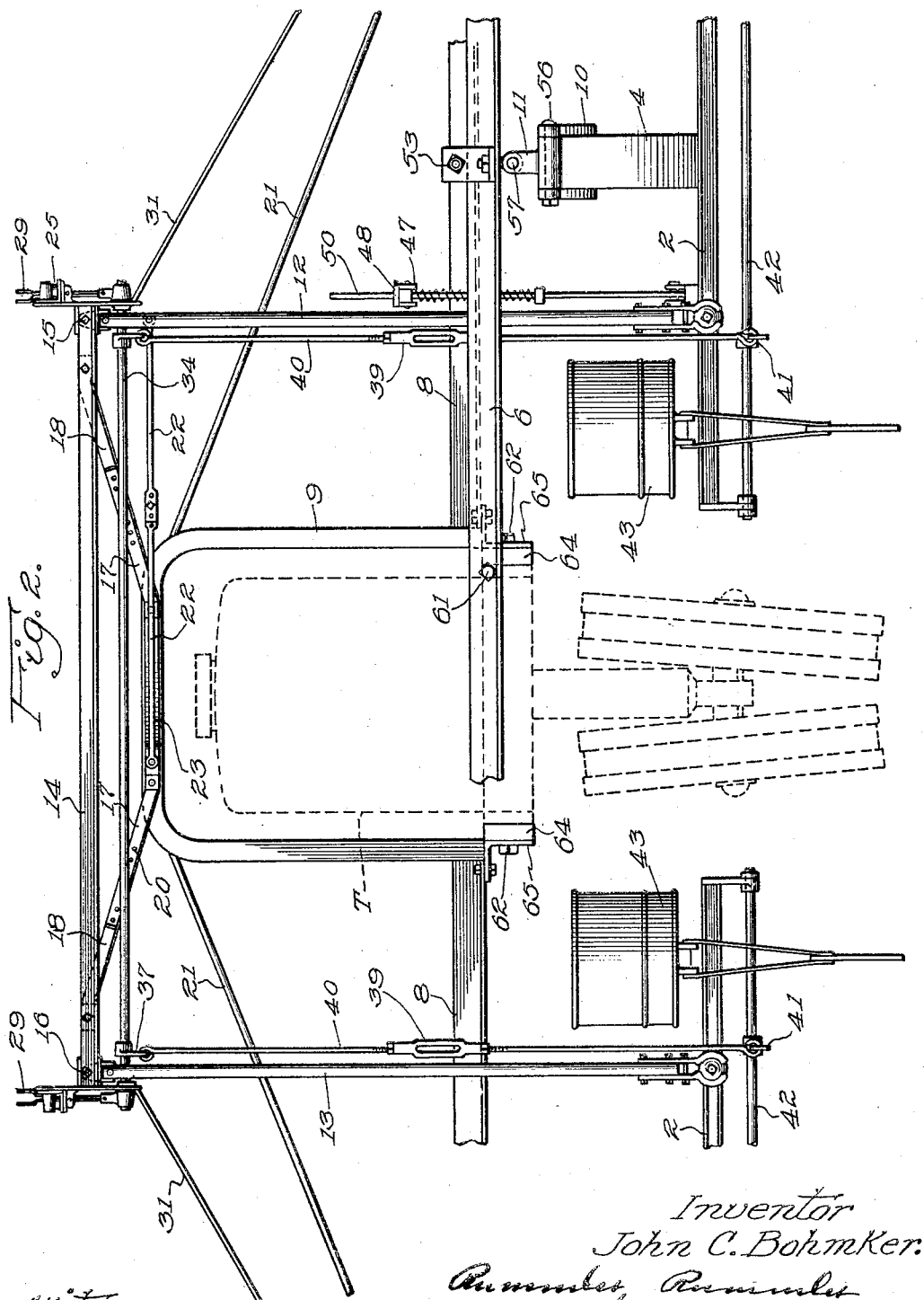

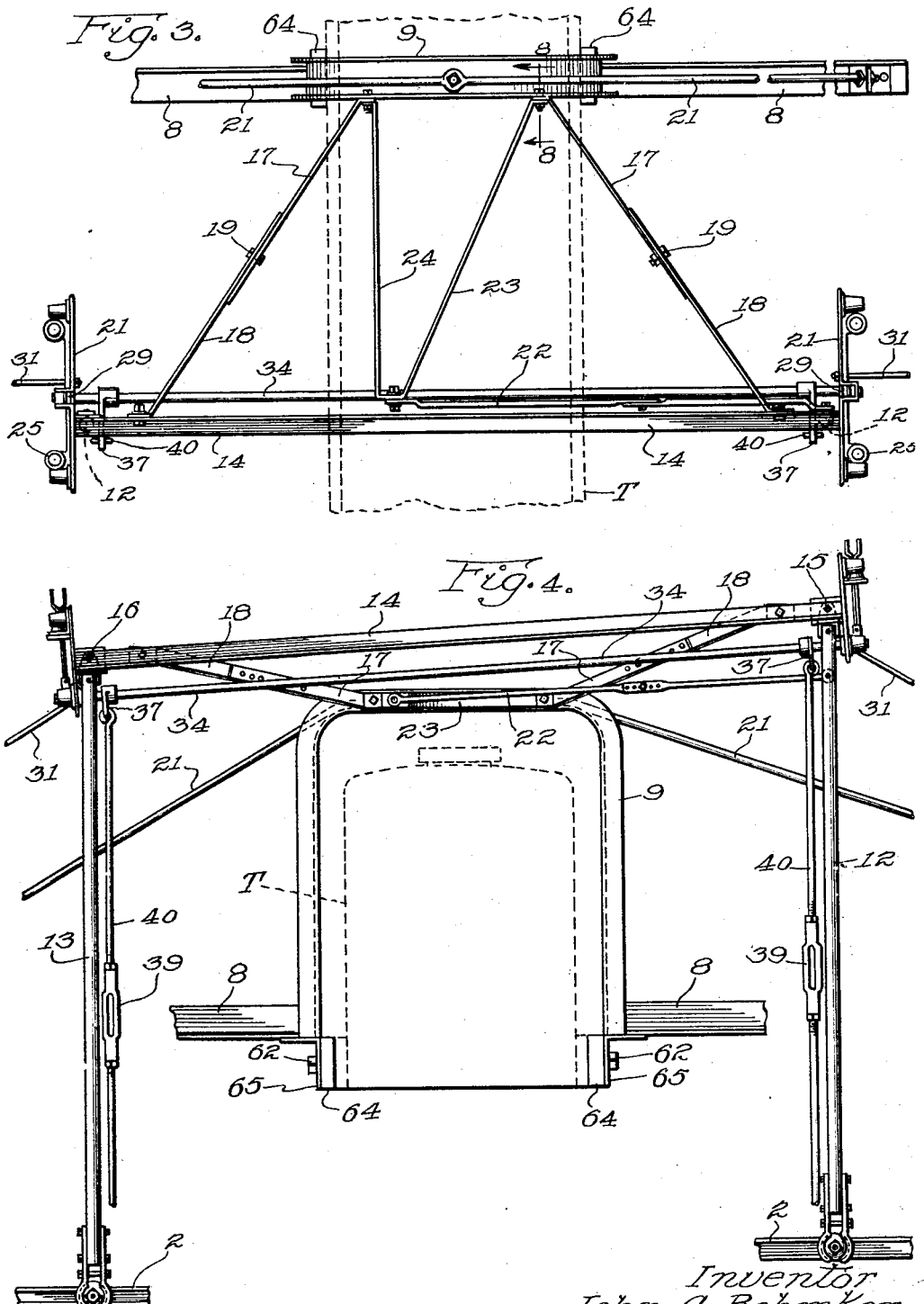

Inventor
John C. Bohmker.

Witness
Arthur M. Franke.

Patented Sept. 27, 1932

1,879,787

UNITED STATES PATENT OFFICE

JOHN C. BOHMKER, OF KANKAKEE, ILLINOIS

CORN PLANTER

Application filed April 23, 1931. Serial No. 532,218.

This invention relates to multiple row corn planters, or other similar farm machinery wherein it is desirable to operate in unison a plurality of like mechanisms arranged in duplicate sets, one on each side of a tractor or power unit.

Among the purposes of the invention is to provide improvements in the connecting frame structure for such mechanisms, and means for transmitting motion from a check head simultaneously to the different planting units, so arranged that a tractor may be driven between the units into position for attachment to the frame structure without necessitating the disassembly or assembly of any parts of the mechanisms.

It is also an object of the invention to provide means for transmitting motion simultaneously to different operated mechanisms, such as the planting units of multiple row corn planters, which permits the necessary relative vertical movement between such mechanisms, without the use of universal joints or other connecting means permitting lost motion or torsion and thus interfere with the simultaneous operation of such mechanisms and correct checking.

Further objects of the invention specific to corn planters is to provide for more central and higher location of the check heads than is customary, in order to improve the operation and effect more accurate checking.

The objects of the invention are accomplished by means of a construction as illustrated in the drawings, which show such parts of a corn planter and operating mechanism therefor, as relate to the present improvements, and the relationship therewith of a power unit or tractor which is indicated by broken lines.

Figure 1 is a side view, partly in section, of the improved mechanism showing its relation with standard parts of a corn planter, and by broken lines indicating the relative position of a tractor.

Fig. 2 is a front view of the mechanism shown in Fig. 1, and with parts of the corn planter broken away.

Fig. 3 is a fragmentary plan view to illustrate the bracing means for the corn planter frame which spans the tractor, and the part of the corn planter frame which carries the check heads and is adjustable forwardly and rearwardly by the bracing means in order to time the action of the planting mechanisms with reference to the location of buttons on the check wire.

Fig. 4 is a front view showing connecting frame and controlling mechanism for the planters as it would appear when the planting mechanism on one side of the tractor is on a higher level than the planting mechanism on the other side of the tractor.

Fig. 5 is an enlarged fragmentary detail in side elevation, illustrating one of the checking units and the attachment thereof to the planter frame.

Fig. 6 is a front view of the mechanism in Fig. 5.

Fig. 7 is a sectional detail taken on the line 7—7 of Fig. 6.

Fig. 8 is a sectional detail taken on the line 8—8 of Fig. 3.

In order to avoid lateral shifting of the corn planter or similar farm machinery, with reference to the tractor which draws it over the ground, instead of drawing such machinery behind the tractor, it has recently become the practice to arrange for a rigid connection between the tractor and corn planting mechanisms located at the sides of the tractor. This arrangement also allows the corn planter to approach more closely the end of the field, less turning space being required.

With such arrangement so far provided, the corn planter units at each side of the tractor were connected together by a rotating or oscillating shaft passing beneath the tractor frame and operated by a check mechanism located at the side ends of the planter frame. In order to effect a connection or disconnection between the planting mechanism and the tractor, it was necessary to remove such shaft passing below the tractor. This and other connections necessitated considerable loss of time. Also the connecting shaft was subject to lost motion due to universal joints, and there was an objectionable torsion when transmitting motion from the check mechanism at one side of the machine to the various planting units. This resulted in the failure of the various planting units from operating in unison.

With the construction illustrated herein, a tractor may be rapidly attached and disconnected from the planting mechanism, as the connecting parts between the planting mechanisms on each side of the tractor are arranged to bridge over the tractor. The check heads are located on top of the connecting bridge structure, thus bringing the check wire at a more desirable angle with reference to the check mechanism, and making it less subject to being caught by obstructions on the ground, and permitting a more uniform tautness of the check wire.

The motion from the check mechanism instead of being transmitted from the side of the machine, in series, to the various planting units, is transmitted from a more desirable location, simultaneously to the planting units on each side of the tractor. This bridge connection may be easily adjusted in a fore and aft direction to time the action of the planters with reference to the location of the buttons on the check wire, and this bridging structure is flexible in a vertical direction to permit the planting units on one side of the tractor to rise and lower with reference to the planting units on the opposite side of the tractor.

Having reference to the drawings, the front portion of the tractor is indicated by broken lines "T" in Figs. 1 and 2. The frame parts of a multiple row corn planter are indicated by 2 to 14 inclusive.

The frame elements 4 constitute draw bars which are connected by links 10 to arms 11, pivotally suspended from the forward transverse frame element 6 in front of the tractor. The frame element 9 arches over the tractor. Upright frame members 12 and 13 extend upwardly from the frame members 2, and are connected together above the tractor by an angle bar 14, to which they are pivotally connected at 15 and 16. These pivotal connections permit the arching frame structure 12, 13 and 14 to be flexed in a vertical plane, as illustrated in Fig. 4. It is braced against fore and aft movement by connections 17 and 18, between the bar 14 and the rigid U-shaped frame member 9.

The members 17 and 18 are connected together by bolts 19 passing through perforations therein, to provide for lengthening or shortening these braces, thus advancing or retracting the check mechanisms which are carried by frame member 14. The structure is braced against lateral motion by an arm 22 extending inwardly from vertical frame member 12 to the fixed bars 23 and 24 extending forwardly from the U-frame 9. The latter is rigid with frame elements 8, which are connected by diagonal bars 21 with the U-frame 9.

The check mechanisms are of standard construction and operation, and the manner of mounting same on the frame member 14 is illustrated in Figs. 5, 6 and 7. The frames 28 of the check mechanisms have flanges 35 fitting the frame element 14 and clamped thereto by the bolts 15 and 16.

The vertical guide rollers 25 are as usual provided with a support 26, which is pivoted by trunnions 27 to ears on the frame 28 of the check head, so that these rollers may be tripped and swung outwardly for the purpose of releasing the check wire when the end of the field is reached. Likewise the forked arm 29, which is operated by buttons on the check wire, may swing outwardly around the pivot 30. When the check wire is released, it slides downwardly on guide rods 31, Fig. 2, clear of the planter mechanism.

The check wire is indicated at 32, Fig. 1. When the buttons or knots 33 thereof, reach the fork 29, the latter is swung with its supporting shaft 34, Fig. 5, from its forward position to its rearward position, as indicated by broken lines in Fig. 5. The transverse shaft 34 has bearings in the check head frame 28.

The pivots 15 and 16, which connect the latter with the vertical frame members 12 and 13 pass through fittings 36, rigidly secured to the upper ends of the upright frame members. When the planter units on one side of the tractor rise or lower with reference to the planter units on the opposite side of the tractor, the check heads tilt with frame 14, as indicated in Fig. 4, and cause the shaft 34 to tilt and remain parallel with the frame member 14. Fixed to the shaft 34 are arms 37, the outer ends of which are pivotally connected with rods 40. The rods 40 are preferably provided with turnbuckles 39 for adjustment as to length. The lower ends of the rods 40 are pivotally connected to arms 41, secured to the horizontal control shafts 42 of the planting mechanisms. The manner in which the control shaft 42 operate or control the operation of the seed dropping mechanisms is well known in the art and is therefore not illustrated or described herein. Springs, not shown, normally serve to hold this mechanism in such position that the forks 29 are in their forward position, Fig. 5. When a button engages a fork and thereby rocks it rearwardly, rods 40 are lifted, and the shafts 42 are rocked sufficiently to operate clutches, as usual, for actuating the different seed dropping mechanisms, or such mechanisms may be operated directly from the oscillating shafts 42.

The planting mechanisms on either side of the machine may be lifted clear of the ground by levers 45, which may be latched in any desired angular position to the fixed quadrants 46, on the planter frame element 7. Rigid with the levers 45 are arms 47, bearing under collars 48 fixed to lifting rods 50, pivoted at their lower ends to the planter frame.

The arms 47 have forwardly extending rods 51 pivoted thereto, to the forward ends of which are attached chains 52 anchored to the frame member 6, at 53, and passing beneath pulleys 54, mounted on draw bars 4. Thus when a lever 45 is pulled downwardly, the planter frame is lifted through the rods 50 and the draw bar is maintained nearly horizontal, as its forward end is lifted at the same time by chain 52.

The pivots 55, 56 and 57, provide for the desired flexibility of action of the draw bar or frame structure of the planter. Depending from frame element 8 are guides 58 passing through frame members 4. The depth of planting is controlled as usual by raising or lowering the planter wheels 59 by the hand wheel 60.

The tractor "T" is attached to the planter frame by bolts 61, 62 and 63. In making the connection between the tractor and the planter, it is only necessary to drive the tractor underneath the frames 9 and 14, and attach the bolts 61 et al. The bolts 62 pass through spacing blocks 64, between the tractor frame and brackets 65 on parts 8 of the planter frame. When these blocks are removed, reasonable clearance is provided between the tractor frame and the frame members of the planter construction, so that the tractor may be easily driven into and out of cooperative relation with the planter.

In operation, assuming that a tractor has been driven into position between the frame members 1, as indicated in Fig. 2, and attached to the planter frame by bolts 61, 62 and 63; also assuming that the check wire has been staked as usual and passed through the guide rollers and fork of one of the check heads; then, as the tractor moves forward, the buttons of the check wire successively engage the fork 29 of the check mechanism, rocking it from its forward position to its rearward position, as indicated in Fig. 5.

Thus the shaft 34 is rocked, and the arms 37 lift upwardly on rods 40, simultaneously rocking shafts 42, which control the seed dropping mechanisms of the planter units 43. The planters on one side of the machine are free to move upwardly or downwardly with reference to the planters on the other side of the machine, because of the pivotal supports 55, 56 and 57, of the respective draw bars, to the common transverse frame element 6, which is rigid with the fore and aft angle frame members 1, cross conected by the rigid U-frame 9. Relatively movable frame elements of the planter carry the vertical frame members 12 and 13, having the pivotal connections at their upper ends, with the cross frame bar 14, which provides for the necessary flexing of this frame structure as illustrated by Fig. 4.

The overhead connection between the planters at the two sides of the tractor enables the user to connect and disconnect the tractor to the planting mechanism without removing any portion of the planter, such as is necessary when the cross connection passes below the tractor. It has the added advantage of insuring more uniform tension in the wire by raising the check head high enough to hold the check wire above the ordinary obstructions in the field, and to lay the wire in a more nearly straight line along the direction of travel, insuring the more perfect cross checking of the seed. There is also less strain on the wire and check head, due to the high position of the check heads and resulting greater angle of the wire with respect to the ground.

Although but one specific embodiment of this invention has been herein shown and described, it will be understood that certain details of the construction shown may be altered or omitted without departing from the spirit of this invention as defined by the following claims.

I claim:

1. A multiple row corn planter comprising a plurality of laterally spaced seed dropping units, a frame structure connecting said units and including an arch for spanning a tractor, and means for rigidly connecting said frame with a tractor.

2. A multiple row corn planter comprising a plurality of laterally spaced seed dropping units, a frame structure connecting said units and including an arch for spanning a tractor, means for rigidly connecting said frame with a tractor, said means including removable spacing blocks.

3. In a corn planter, two sets of planting units, each set having an individual frame structure, a common frame structure to which said individual frame structures are pivotally connected, said common frame structure being in the form of an arch, extending upwardly, a check head mounted upon said arch, and means for transmitting motion from said check head to the two sets of planter units.

4. A multiple row corn planter comprising individual corn planting units, a common frame connecting said units, means carried by said frame for simultaneously controlling the operation of said planting units, said frame and means carried thereby being formed between said units to arch upwardly for the purpose of spanning a driving tractor for the corn planter, and flexible joints in said frame and in said means permitting said frame and means to flex in a vertical plane as one of the units rises or lowers with reference to the other.

5. A multiple row corn planter comprising a plurality of laterally spaced seed dropping units, a rigid frame, each of said seed dropping units having an individual frame pivotally connected to said rigid frame, a flexible frame structure connecting said individual frames, said flexible frame structure including a pair of laterally spaced vertical members and a horizontal member pivotally connected with the upper ends of said vertical members, check mechanism mounted on the upper end of said flexible frame structure, and control means for said seed dropping units leading from said checking mechanism to the seed dropping units and including flexible connections which will flex with said flexible frame.

6. A multiple row planter comprising a plurality of laterally spaced seed dropping units, an arched frame structure connecting said units and including flexible joints for permitting the seed dropping units to have relative vertical motion, check mechanisms mounted upon said arched frame structure and including a transverse shaft operated by said check mechanisms and link connections from said shaft to said seed dropping units.

Signed at Chicago this 18th day of April, 1931.

JOHN C. BOHMKER.